Patented Dec. 25, 1928.

1,696,363

UNITED STATES PATENT OFFICE.

WILLIAM PEARSON SKERTCHLY, OF SPONDON, NEAR DERBY, ENGLAND, ASSIGNOR TO CELANESE CORPORATION OF AMERICA, A CORPORATION OF DELAWARE.

PURIFICATION OF ACETIC ANHYDRIDE.

No Drawing. Application filed March 25, 1926, Serial No. 97,448, and in Great Britain February 13, 1926.

This invention relates to the purification of acetic anhydride.

I have found that acetic anhydride containing sulphur or sulphur compounds can be purified by treatment with sodium acetate,—or other alkali metal acetate or earth alkali metal acetate or other metallic acetate,—and chlorine, or by treatment with two or more of such acetates and chlorine.

In carrying out the invention the acetate or acetates are preferably used anhydrous and they are preferably employed in powdered form.

In carrying out the invention I may first mix the acetic anhydride, at any temperature up to its boiling point, with sodium or other acetate or with two or more acetates, and then introduce chlorine in quantities sufficient to combine with any reactive sulphur or sulphur compounds, after which the acetic anhydride may be distilled and collected in any suitable way.

The following example serves to illustrate one method of executing the present invention, it being understood that this is given only by way of illustration and is in no way limitative.

Example.

60 parts by weight of finely powdered anhydrous sodium acetate are placed in 1,000 parts by weight of unpurified acetic anhydride (containing, for example, 3 parts by weight of sulphur) and then about 7 parts by weight of chlorine are introduced into the mixture while the mixture is stirred continuously. After mixing thoroughly for about half an hour, the acetic anhydride is distilled and collected in any suitable manner.

What I claim and desire to secure by Letters Patent is:—

1. Process for the purification of acetic anhydride containing sulphur or sulphur compounds, comprising treating the same with chlorine and with at least one metallic acetate.

2. Process for the purification of acetic anhydride containing sulphur or sulphur compounds, comprising treating the same with chlorine and with at least one alkali metal acetate.

3. Process for the purification of acetic anhydride containing sulphur or sulphur compounds, comprising treating the same with chlorine and with sodium acetate.

4. Process for the purification of acetic anhydride containing sulphur or sulphur compounds, comprising treating the same with chlorine and with at least one anhydrous metallic acetate.

5. Process for the purification of acetic anhydride containing sulphur or sulphur compounds, comprising treating the same with chlorine and with at least one anhydrous alkali metal acetate.

6. Process for the purification of acetic anhydride containing sulphur or sulphur compounds, comprising treating the same with chlorine and with anhydrous sodium acetate.

7. Process for the purification of acetic anhydride containing sulphur or sulphur compounds, comprising mixing the same with at least one metallic acetate and then introducing chlorine into the mixture.

8. Process for the purification of acetic anhydride containing sulphur or sulphur compounds, comprising mixing the same with at least one metallic acetate, then introducing chlorine into the mixture and finally distilling the acetic anhydride.

In testimony whereof, I have hereunto subscribed my name.

WILLIAM PEARSON SKERTCHLY.